United States Patent [19]

Edrich et al.

[11] Patent Number: 5,388,801
[45] Date of Patent: Feb. 14, 1995

[54] VEHICLE SEAT, ESPECIALLY FOR COMMERCIAL VEHICLES

[75] Inventors: Hans Edrich, Heltersberg; Günter Franzmann, Rockenhausen; Karl-Peter Armbrust, Ensheim, all of Germany

[73] Assignee: Keiper Recaro GmbH & Co., Germany

[21] Appl. No.: 944,272

[22] Filed: Sep. 14, 1992

[30] Foreign Application Priority Data

Sep. 14, 1991 [DE] Germany ............................. 4130664

[51] Int. Cl.6 ............................................. B60N 2/16
[52] U.S. Cl. .................................... 248/564; 248/421
[58] Field of Search .............. 248/421, 157, 277, 419, 248/561, 564, 565, 588; 297/344.15, 344.16, 344.17, 423.45; 108/145, 147

[56] References Cited

U.S. PATENT DOCUMENTS

| | | | |
|---|---|---|---|
| 3,075,736 | 1/1963 | Freedman | 248/564 X |
| 3,874,626 | 4/1975 | Gross et al. | 248/421 X |
| 4,295,627 | 10/1981 | Graves | 248/564 X |
| 4,353,594 | 10/1982 | Lowe | 248/564 X |
| 4,382,573 | 5/1983 | Aondetto | 248/421 X |
| 4,448,386 | 5/1984 | Moorhouse et al. | 248/564 |
| 4,573,657 | 3/1986 | Sakamoto | 248/421 X |
| 4,659,052 | 4/1987 | Nagata | 248/421 X |
| 4,729,539 | 3/1988 | Nagata | 248/421 X |
| 4,813,645 | 3/1989 | Iwami | 248/588 |
| 4,822,094 | 4/1989 | Oldfather et al. | 248/421 X |
| 4,946,145 | 8/1990 | Kurabe | 297/344.16 X |
| 5,005,894 | 4/1991 | Nagata | 248/421 X |
| 5,169,112 | 12/1992 | Boyles et al. | 248/421 X |
| 5,176,355 | 1/1993 | Carter | 297/344.16 X |

FOREIGN PATENT DOCUMENTS 2915259 10/1980 Germany ............................. 248/421

Primary Examiner—Rinaldi I. Rada
Assistant Examiner—Clark F. Dexter
Attorney, Agent, or Firm—Wigman, Cohen, Leitner & Myers

[57] ABSTRACT

A seat for vehicles, especially commercial vehicles, of which the cushion support is mounted on a swinging frame with two identically configured pairs of levers which intersect and pivot with each other, has on each side of the swinging frame at least one fastening point for a seat belt system. Pivot connections combined with a guide for each one running longitudinally along the seat connect the rear terminal segments of the rocking levers with the lower part and the upper part of the swinging frame. The rocking levers extending from the upper part of the swinging frame obliquely forward and downward are embodied with a diminished carrying capacity as compared with the other rocking levers.

10 Claims, 3 Drawing Sheets

VEHICLE SEAT, ESPECIALLY FOR COMMERCIAL VEHICLES

BACKGROUND OF THE INVENTION

The invention relates to a seat for vehicles, especially commercial vehicles.

In known seats of this type, extensive reinforcement is required for the seat structure and also for the sets of rails which connect the seat base part with the vehicle floor. Such replacement is also required insofar as a seat belt is fastened to the cushion support, independent of whether only a lap belt is used, or a three-point seat belt with a force transmission point for the shoulder belt is used or simply a three-point seat belt is connected with the cushion support of the seat.

Since such additional reinforcements are undesirable both because of greater weight and because of higher cost, the object of the invention is to provide an improved seat of the aforementioned type so that the additional cost required to allow for a fastening fixture to fasten a seat belt to the cushion support of the seat can be considerably decreased.

SUMMARY AND ADVANTAGES OF THE INVENTION

According to the present invention the pivot connections are combined with a guide running lengthwise along the seat, which combinations are indicated hereinafter as thrust articulations, connecting the rear terminal segment of the rocking lever with the lower part or the upper part of the swinging frame. Accordingly, there results a minimization of the forces being transmitted from these thrust articulations and being picked up by the rear terminal of the guide rails, which forces, by the very fact that thrust articulations transmit no forces in thrust direction, are considerably smaller than the forces in the case of stationary articulations. This is a great advantage insofar as the load capacity of the rails must be adapted to the forces being generated in their rear terminal segment, because the maximum load on the rails is there at the terminal segment. With the solution according to the invention this maximum and with it the cost for the rails and their weight can be reduced in an extraordinary manner. Weight reduction and cost savings however also lead to diminishment of the carrying capacity of the rocking lever extending from the top part of the swinging frame obliquely forward and downward. This is also possible without loss of security, because with the solution according to the invention these rocking levers are subjected to considerably lower stress than the rocking lever running from the rear of the swinging frame lower part obliquely forward and upward. Regardless of the seat belt system configuration (only one lap belt fastened to the swinging frame, a combined lap belt of this sort and a shoulder belt oriented to the vehicle or a three-point belt which is fastened exclusively to the swinging frame), the load factor of the rocking levers extending from the swinging frame upper part progressively obliquely forward and downward is only about half or one fourth as great as the bending torque, load of the rocking levers running from the rear terminal of the swinging frame lower part progressively obliquely forward and upward.

The scissor configuration pivot point, the connection point of the rocking levers forming a scissors configuration with one another, is constructed as a statically balanced bearing point, thereby avoiding pitching moments or maximum torques.

With regard to the above-mentioned load ratios and the lowest possible manufacturing cost, in the case of one preferred embodiment the rocking levers which have the higher carrying capacity consist of two identically configured and adjacently arranged parts. This is more advantageous than providing rocking levers with different thicknesses or shapes, when the rocking levers are configured as flat rails, as for instance, when punched out of flat stock. Then it is possible to configure both parts of the rocking levers of heightened carrying capacity to be identical and the other rocking levers can also all be identical.

With regard to symmetrical or balanced loading it is advantageous to arrange each of the two rocking levers of lower carrying capacity between the two parts of one of the levers of heightened carrying capacity.

The potentials of the rocking levers can be optimized by the varied effective strengths of the rocking levers, without requiring any deviation from optimum construction of the scissors configuration formed by the rocking levers.

In one preferred embodiment those terminal segments of the rocking levers of which the pivot axes are in alignment with one another are inflexibly connected each with a common shaft. Of these shafts those which form a combined rocking connection with a guide running lengthwise along the seat have rotatably mounted tread rollers at both of their terminal segments, and said rollers are guided in U-shaped rails. But also those shafts which only form a purely rocking connection can support such rollers on their terminal segments. Transverse thrust movement of these shafts can be prevented in a simple manner by use of additional fixed bearings. In case of necessity, it is then possible to release the additional, fixed bearing and to utilize the now present longitudinal thrusting capacity of these rocking connections to promote a horizontal spring action of the seat.

The U-shaped rails most advantageously form the longerons of the base part and of the swinging frame.

The rocking connections most advantageously have some axial play in order to be able to compensate axial manufacturing tolerances.

In one preferred embodiment the rocking levers are connected with a frame-like swinging frame upper part on which is braced the cushion support upper part forming the contact surface for the cushion above a height adjusting device.

BRIEF DESCRIPTION OF THE DRAWINGS

The invention is to be described in greater detail hereinafter relative to one exemplary embodiment shown in the drawings, wherein.

DETAILED DESCRIPTION OF THE PREFERRED EMBODIMENTS

Figure 1:
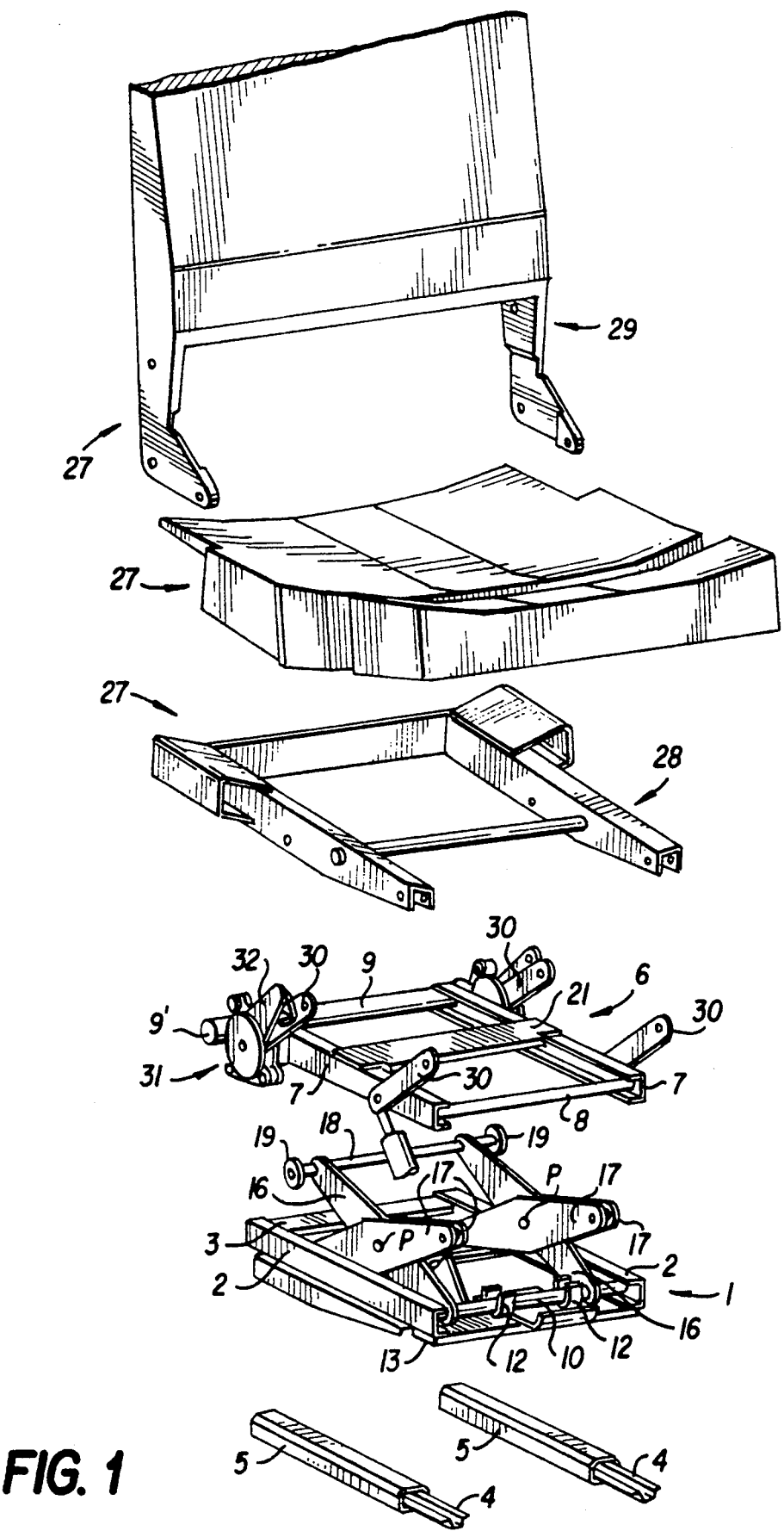
FIG. 1 shows a perspective representation of an exploded view of the essential parts of an exemplary embodiment.
Figure 2:
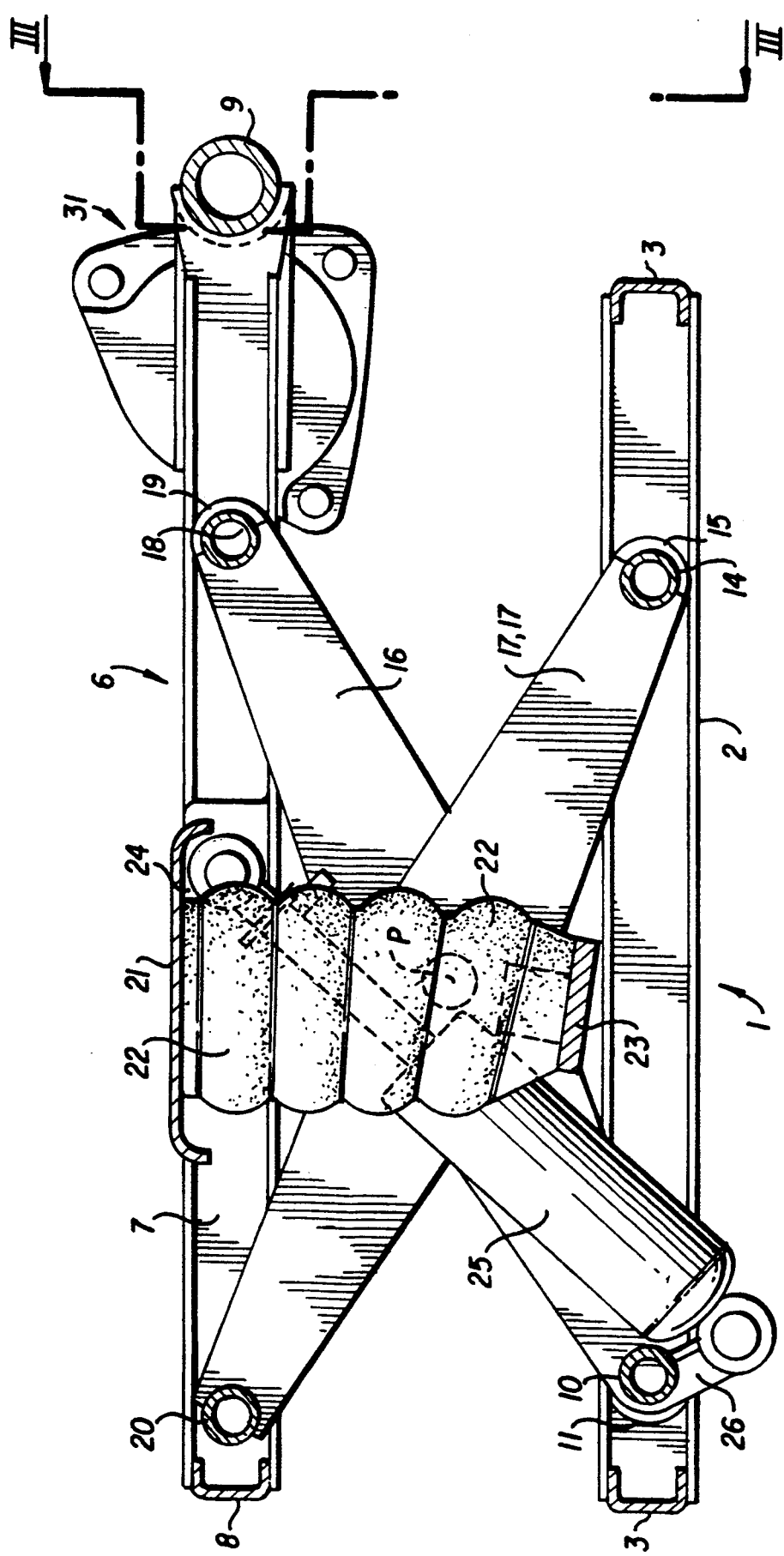
FIG. 2 shows a longitudinal section through the base part and the cushion support lower part as well as a side view of elements connecting these two parts with one another.
Figure 3:
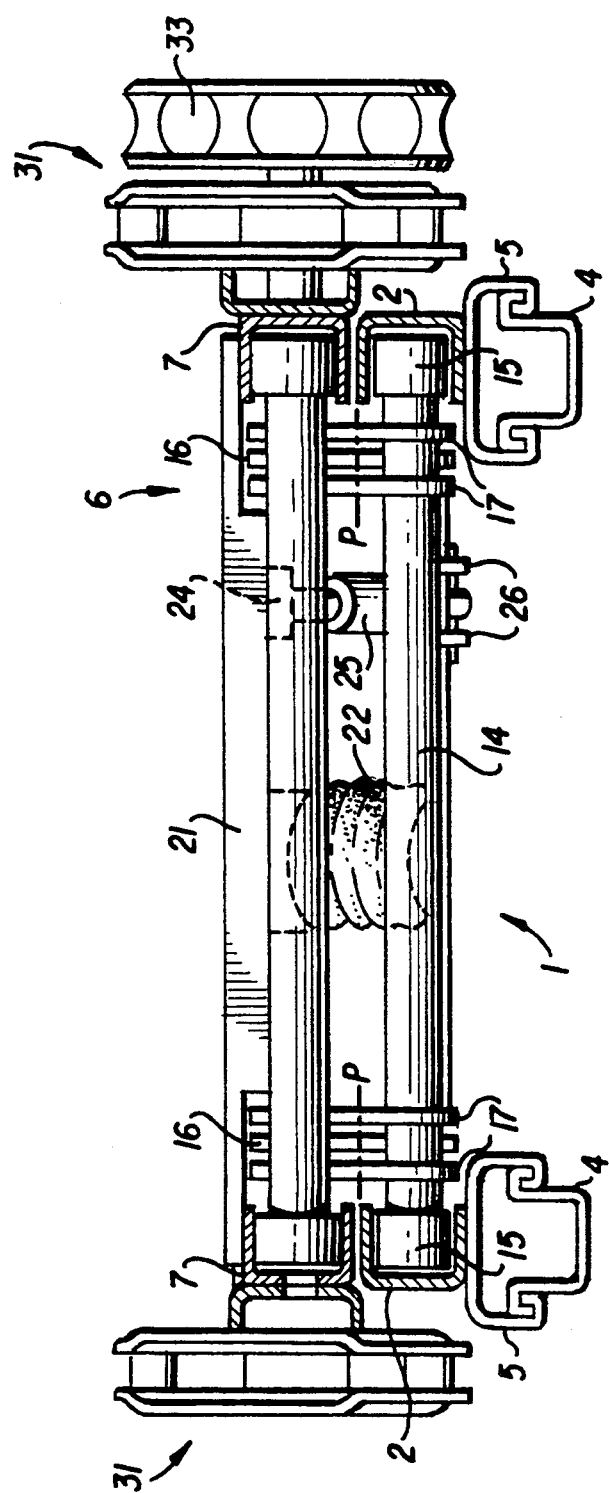
FIG. 3 shows a section along line III—III of FIG. 2, but with the cushion support lower part in a completely lowered position.

Referring now to the drawings wherein like numerals indicate like elements throughout the several views, a so-called swing-seat for vehicles, especially for commercial vehicles, has a swinging frame with a lower part or base part 1 in the form of a rectangular frame. The two side girders 2 are each in the configuration of a U-shaped profiled rail and each profile is open toward the opposite side girder 2. These two side girders 2 are fixedly connected with one another both at their front terminals and at their rear terminals by a transverse girder 3. Transverse girders 3 also have U-shaped profiles. For facility of viewing in FIG. 1 they are not shown as U-shaped profiled rails.

Seat supports including two identically configured pairs of rails are provided to connect the seat with the vehicle, each set of rails consisting of a bottom rail 4 to be connected with the vehicle and a top rail 5 in form-locking engagement with the bottom rail, but longitudinally slidable relative to it. The side girders 2 rest on the two top rails 5 and are securely connected with them.

A swinging frame upper part 6 in the form of a rectangular frame forms the mounting for a height adjusting device, and the frame upper part is at least almost the same size as the frame forming the base or lower part 1. It consists of two longitudinal girders 7 as well as a front traverse 8 and a rear traverse 9, which connect the two longitudinal girders 7 with each other at their front and rear terminals. Both longitudinal girders 7 are U-shaped profiled rails having profiles identical to those of side girders 2. Also, each of their profiles is open toward the facing longitudinal girder 7. Front traverse 8 is a U-shaped profiled rail, whereas rear traverse 9 is formed by a tube which projects outward past the two longitudinal girders 7 and forms the two fastening points 9' for a seat belt system. The belt system is fastened to both terminals of rear traverse 9.

Parallel to the front transverse girder 3 of base part 1 and at a slight distance from this member is arranged a first shaft 10, which for purposes of weight is embodied as a tube and supports a plastic roller 11 on each of its two ends. The two plastic rollers 11 are mounted without any play between the arms of side girders 2 and form two pivot bearings for the first shaft 10. Plastic rollers 11 cannot be moved longitudinally along side girders 2, however, because the first shaft 10 is also rotatably mounted in two fixed bearings 12, securely mounted on a support 13 which in turn is securely connected with base part 1 and with their two U-shaped arms overlapping first shaft 10 from below. A second shaft 14, located parallel to first shaft 10 and likewise in the form of a tube, is arranged at some distance to the rear of first shaft 10 and, the same as the first, supports a plastic tread roller 15 on each of its two terminal segments, which tread rollers engage without any play between the arms of either one or the other side girder 2. Each plastic tread roller 15 forms a thrust bearing, in other words a combination of a pivot bearing with a guide member running in longitudinal direction relative to side girders 2, since they can be moved longitudinally in side girders 2.

The terminal front segment of each of two identically configured rocking levers 16 is tightly connected with first shaft 10, and said levers 16 are arranged near one or the other side girder 2 between these girders and parallel to each other. The two identically configured rocking levers 16 are in the form of flat rails. They are punched out of a sheet of steel and increase in width toward the middle.

The rear terminal segment of each of two rocking lever pairs 17 is tightly connected with second shaft 14. Both rocking levers of each rocking lever pair 17 are configured the same as rocking lever 16. One each of the rocking levers 16 and of the rocking lever pair 17 form a scissor-like configuration of a crosshead guide. Rocking levers 16, which are guided between the rocking levers of rocking lever pair 17 associated with them, are thus connected pivotally at mid-length with the associated rocking lever pair 17 at its mid-length at pivot point P. The two connecting journals used for this purpose are aligned with one another and define an axis running parallel to first shaft 10 and second shaft 14, therefore extending transverse to the seat.

Rocking levers 16 extending from the front of base part 1 and progressively obliquely to the rear end upward are connected inflexibly with one another in the area of their rear terminal segment by a third shaft 18, which is configured as a tube and on each of its two ends supports a plastic tread roller 19. The two plastic tread rollers 19 engage without any play, but longitudinally slidably, in the U-shaped profile of one and the other longitudinal girder 7, respectively, of the swinging frame upper part 6 and here each forms a thrust bearing. Correspondingly, the front terminal segment of rocking lever pair 17 extending obliquely forward and upward is securely connected with a fourth shaft 20, of which both of the terminals are pivotally mounted in bearing members. These bearing members are inserted tightly in longitudinal girders 7 in the vicinity of the front traverse.

The crosshead guide for swinging frame upper part 6, formed by the two scissors configurations in connection with side girders 2 and longitudinal girders 7, has a very low friction quotient, whereupon a certain axial play of the shafts is also present, which can compensate axial manufacturing tolerances.

Approximately in the middle between front traverse 8 and rear traverse 9 of swinging frame upper part 6, the ends of a top transverse support 21 are tightly connected with the two longitudinal girders 7, and the top end of a spring 22 is braced on support 21, in which case it is preferably a compressed air spring. Its lower terminal is braced on a lower transverse support 23, which is suspended at mid-length on the two inside rocking levers of rocking lever pair 17.

Adjacent to the bracing point for spring 22 is securely mounted a bearing block 24, on the lower side of upper transverse support 21, to which is articulated the one terminal of an oscillation damper 25. The other terminal of this oscillation damper 25 is articulated pivotally to two connection levers 26 which project downward from first shaft 10 and are securely connected with first shaft 10.

The cushion support upper part 27 is braced height adjustably on the swinging frame upper part 6 of the swinging frame forming a cushion support lower part, and cushion support upper part 27 consists of a supporting frame 28 for the seat part cushion and a support 29 mounted pivotally at the rear terminal of this supporting frame and articulated and securable in any selectable pivot position, for the backrest cushion. The height adjusting device has four straps 30 which form front and rear pairs of guides. In the exemplary embodiment, the two pairs of guides are of the same effective length.

Straps 30 are articulated in the area of their bottom ends on the outside to longitudinal girders 7 so that the pivot axis of the front pair of guides runs the same as that of the rear pair of guides, transverse to the seat. Correspondingly, the top end of strap 30 is connected pivotally with supporting frame 28. All straps 30 extend in the same direction, dependent upon the height setting of supporting frame 28 relative to the swinging frame upper part. The lower pair of guides is connected each with an adjustment gearing 31, and said gearings are controlled in common by means of a not shown connecting shaft. They can be powered manually by a hand wheel 33 or by an electric motor. In the exemplary embodiment the two adjustment gearings 31 are configured as a self-impeding gear articulation fixture, customary in vehicle seats. If a so-called tumbler fixture is employed, then it is possible, as shown in FIG. 1, to compensate the tumbler movement of its top armature part 32 in such a manner that this top armature part 32 is connected by a connecting strap with the guide lever 30 to be swivelled.

When pavement irregularities or the like cause swinging movements of the swinging frame upper part 6 relative to base part 1, the angle which rocking levers 16 form with rocking lever pairs 17 is changed. Thus only second shaft 14 and third shaft 18 are thrust in the guides formed by side girders 2 and longitudinal girders 7, and they simultaneously execute a rotary movement. On the other hand first shaft 10 and fourth shaft 20 execute only a rotary movement.

If an abrupt deceleration of the vehicle occurs, for instance in a minor accident, then the forces to be absorbed by the seat belt system are introduced in the rear traverse 9 of the swinging frame upper part 6. This is also essentially true for the force which a shoulder belt fastened to the backrest transmits to the backrest, since at least the primary portion of this load is transferred from swinging frame upper part 6 over the rear pair of guides to the rear terminal of longitudinal girders 7. From rear traverse 9 these forces are transmitted over rocking levers 16 and rocking lever pair 17, and indeed so that the portion to be transferred over second shaft 14 and top rail 5 onto bottom rail 4 is considerably smaller than the portion to be transmitted over first shaft 10 onto bottom rail 4. Because of this, the danger that top rail 5 may come out of engagement with bottom rail 4 is considerably reduced.

Although only preferred embodiments are specifically illustrated and described herein, it will be appreciated that many modifications and variations of the present invention are possible in light of the above teachings and within the purview of the appended claims without departing from the spirit and intended scope of the invention.

We claim:

1. A seat for vehicles, especially for commercial vehicles, having seat supporting means and a cushion support, said seat being capable of swinging and comprising:
   a swinging frame including:
   a base part formed as a lower frame and supported by said seat supporting means and having a front and a rear and including a pair of substantially parallel opposedly mounted lower girders forming lower side girders of the lower frame,
   an upper part supporting said cushion support, said upper part formed as an upper frame and having a front and a rear and including a pair of substantially parallel opposedly mounted upper girders forming upper side girders of the upper frame,
   two scissor-like crosshead devices, one provided at each respective side of said swinging frame, each having a pivot axis transverse to said upper and lower side girders, said crosshead devices disposed between said lower base part and said upper part, each of said crosshead devices comprising a higher carrying capacity member formed by a pair of rocking levers, each rocking lever of said pair arranged parallel and adjacent to each other, and a lower carrying capacity member formed by a single rocking lever disposed between and pivotally attached to said pair of rocking levers of said higher carrying capacity member, each of said rocking levers having an upper end and a lower end, said upper ends of all said rocker levers being pivotally connected to said upper girders and said lower ends of all said rocking levers being pivotally connected to said lower girders.

2. The seat as in claim 1, further comprising a fastening means for a seat belt system, said fastening means being disposed at the rear of said swinging frame upper part.

3. The seat as defined in claim 1, wherein the rocking levers are in the form of flat rails and are of identical thickness.

4. The seat as in claim 1, further comprising damping means for damping oscillation between said swinging frame parts, said damping means being disposed between said swinging frame upper part and said lower base part.

5. The seat as defined in claim 1, wherein said higher carrying capacity rocking levers extend obliquely upwardly from said rear of said lower base part to said front of said upper part and said lower carrying capacity rocking levers extend obliquely downwardly from said rear of said upper part to said front of said lower base part, wherein further the front ends of said lower carrying capacity rocking levers are connected with said front of said lower base part such that they are immovable in a direction along said lower side girders and the front ends of said higher carrying capacity rocking levers are connected with said front of said upper part such that they are immovable in a direction along said upper side girders, and wherein further the rear ends of said lower carrying capacity rocking levers are movably guided by and along said upper side girders and the rear ends of said higher carrying capacity rocking levers are movably guided by and along said lower side girders.

6. The seat as defined in claim 5, said rocking levers each having a front and a rear terminal segment, said terminal segments each including a pivot end and each of said pivot ends of the terminal segments at one side of said swinging frame are in alignment along respective pivot axis with a corresponding one of the pivot ends of corresponding terminal segments at the other side of said swinging frame, and wherein each of the aligned pivot ends of the terminal segments are immovably connected with a respective shaft which extends along the respective pivot axis, each shaft forming a pivotal connection with a respective one of said upper and lower side girders, wherein front shafts are connected to the front terminal segments and are mounted only pivotally in said side girders and rear shafts are connected to the rear terminal segments and are mounted to said side girders such that they are part of a combined pivot and thrust bearing connection with said side girders, said side girders being in the form of U-shaped rails running in a longitudinal direction along the seat, each end of said rear shafts supporting a rotating tread roller such that said tread rollers are each guided in one of said U-shaped rails.

7. The seat as defined in claim 6, wherein the pivot connections of said shafts have some axial play.

8. The seat as defined in claim 7, wherein the front shaft mounted in said lower part supports a roller at each of its two ends, said rollers engaging in the U-shaped rails forming the two side girders of the lower part, said shaft secured against a longitudinal thrust along the lower side girders by at least one fixed bearing of the lower part, said fixed bearing being detachable for the purpose of provision of a horizontal spring thrust.

9. The seat as defined in claim 8, wherein said cushion support is supported by a height adjusting device, which is supported by said upper part of said swinging frame.

10. The seat as defined in claim 9, wherein:
a) the height adjusting device has a front and a rear pivot arm on each side of the seat;
b) both of said front pivot arms and both of said rear pivot arms are connected pivotally coaxially with the swinging frame upper part and with the cushion support upper part; and
c) the two rear pivot arms are connected by means of two adjusting gearings which are driven only commonly and synchronously by driving means.

* * * * *